(12) United States Patent
Yosher et al.

(10) Patent No.: US 12,450,064 B2
(45) Date of Patent: Oct. 21, 2025

(54) INSTRUCTION SET ARCHITECTURE PUSH WITH FRAME POINTER INSTRUCTION

(71) Applicant: QUALCOMM Incorporated, San Diego, CA (US)

(72) Inventors: Albert Yosher, Tel Mond (IL); James Ball, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/612,737

(22) Filed: Mar. 21, 2024

(65) Prior Publication Data
US 2025/0298619 A1    Sep. 25, 2025

(51) Int. Cl.
*G06F 9/30* (2018.01)

(52) U.S. Cl.
CPC ...... *G06F 9/30145* (2013.01); *G06F 9/30134* (2013.01); *G06F 9/30181* (2013.01)

(58) Field of Classification Search
CPC ............. G06F 9/30181; G06F 9/30134; G06F 9/30145
See application file for complete search history.

(56) References Cited

U.S. PATENT DOCUMENTS

| | | | |
|---|---|---|---|
| 7,089,400 B1* | 8/2006 | Pickett | G06F 9/30134 712/E9.05 |
| 2014/0283040 A1* | 9/2014 | Wilkerson | G06F 12/145 726/22 |
| 2017/0285986 A1* | 10/2017 | Gopal | G06F 12/0897 |
| 2019/0065293 A1* | 2/2019 | Elsishans | G06F 9/544 |

* cited by examiner

*Primary Examiner* — Zachary K Huson
(74) *Attorney, Agent, or Firm* — Seyfarth Shaw LLP

(57) ABSTRACT

A method for executing an instruction set architecture (ISA) push with frame pointer instruction is described. The method includes utilizing a frame pointer. The method also includes decoding the ISA push with frame pointer instruction. The method further includes executing the decoded ISA push with frame pointer instruction. The method also includes performing, during the executing of the decoded ISA push with frame pointer instruction, a multiple register push operation on a stack while preserving a value of a stack pointer register and a value of a frame pointer register prior to executing the decoded ISA push with frame pointer instruction.

16 Claims, 7 Drawing Sheets

| Mnemonic | 15 | 14 | 13 | 12 | 11 | 10 | 09 | 08 | 07 | 06 | 05 | 04 | 03 | 02 | 01 | 00 | Description | Comment |
|---|---|---|---|---|---|---|---|---|---|---|---|---|---|---|---|---|---|---|
| | 7 | | func6 | | | | | r1s' | | func2 | | r2s' | | | opcode | | | CMMV-type |
| CM.MVSA01 | 1 | 0 | 1 | 0 | 1 | 1 | | r1s' | | 0 | 1 | | r2s' | | 1 | 0 | Move 2 registers: r1s' = a0; r2s' = a1 | Matching encoding Zcmp CM.MVSA01 |
| CM.MVA01S | 1 | 0 | 1 | 0 | 1 | 1 | | r1s' | | 1 | 1 | | r2s' | | 1 | 0 | Move 2 registers: a0 = r1s'; a1 = r2s' | Matching encoding Zcmp CM.MVA01S |
| | | | func6 | | | | func2 | | | urlist | | | spimm | | opcode | | | CMPP-type |
| CM.PUSH | 1 | 0 | 1 | 1 | 1 | 1 | 0 | 0 | | urlist | | | [5:4] | | 1 | 0 | Function entrance (prologue), including stack allocation | Matching encoding Zcmp CM.PUSH |
| CM.PUSHFP | 1 | 0 | 1 | 1 | 1 | 1 | 0 | 1 | | urlist | | | [5:4] | | 1 | 0 | Function entrance (prologue), including stack allocation and frame pointer | New proposed instruction |
| CM.POP | 1 | 0 | 1 | 1 | 1 | 1 | 1 | 0 | | urlist | | | [5:4] | | 1 | 0 | Function epilogue, including stack deallocation | Matching encoding Zcmp CM.POP |
| CM.POPRETZ | 1 | 0 | 1 | 1 | 1 | 1 | 0 | 0 | | urlist | | | [5:4] | | 1 | 0 | Function exit with return zero (epilogue), including stack deallocation, a0 = 0 | Matching encoding Xcmp CM.POPRETZ |
| CM.POPRET | 1 | 0 | 1 | 1 | 1 | 1 | 1 | 0 | | urlist | | | [5:4] | | 1 | 0 | Function exit (epilogue) including stack deallocation | Matching encoding Zcmp CM.POPRET |

FIG. 4

INSTRUCTION SET ARCHITECTURE PUSH WITH FRAME POINTER INSTRUCTION

BACKGROUND

Field

Aspects of the present disclosure relate to semiconductor devices and, more particularly, to an instruction set architecture push with frame pointer instruction.

Background

Many modern-day processors are developed based on proprietary processor architectures. Conversely, a fifth generation (V) reduced instruction set architecture (RISC-V) is an open-standard instruction set architecture (ISA) used to develop custom processors for a variety of applications. The RISC-V ISA, which was developed at the University of California, Berkeley, is considered the fifth generation of processors built on the concept of a reduced instruction set computer (RISC). Unlike proprietary processor architectures, RISC-V is an open-standard ISA used for the development of custom processors targeting a variety of end-user applications.

Execution of real-world applications involves larger and more complex processor cores. Instructions added to a multi-core processor increase a size, complexity, and power dissipation of the processor. Recently, the RISC-V code size reduction task group promulgated Zc extensions, which form a portion of the RISC-V standard compressed instruction-set extension, referred to as "C." During execution, the Zc extension reduces static and dynamic code size by adding add additional short 16-bit instruction encodings for common operations. Unfortunately, processors configured with the Zc extensions are unable to support new 16-bit push instructions when software is utilizing a frame pointer. An ISA push with a frame point instruction is desired.

SUMMARY

A method for executing an instruction set architecture (ISA) push with frame pointer instruction is described. The method includes utilizing a frame pointer. The method also includes decoding the ISA push with frame pointer instruction. The method further includes executing the decoded ISA push with frame pointer instruction. The method also includes performing, during the executing of the decoded ISA push with frame pointer instruction, a multiple register push operation on a stack while preserving a value of a stack pointer register and a value of a frame pointer register prior to executing the decoded ISA push with frame pointer instruction.

A non-transitory computer-readable medium having program code recorded thereon for executing an instruction set architecture (ISA) push with frame pointer instruction is described. The program code is executed by a processor. The non-transitory computer-readable medium includes program code to utilize a frame pointer. The non-transitory computer-readable medium also includes program code to decode the ISA push with frame pointer instruction. The non-transitory computer-readable medium further includes program code to execute the decoded ISA push with frame pointer instruction. The non-transitory computer-readable medium also includes program code to perform, during the executing of the decoded ISA push with frame pointer instruction, a multiple register push operation on a stack while preserving a value of a stack pointer register and a value of a frame pointer register prior to executing the decoded ISA push with frame pointer instruction.

This has outlined, broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for conducting the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

FIG. 4 is a table illustrating a RISC-V push with frame pointer instruction for a RISC-V standard compressed instruction-set extension, according to various aspects of the present disclosure.

DETAILED DESCRIPTION

Figure 1:
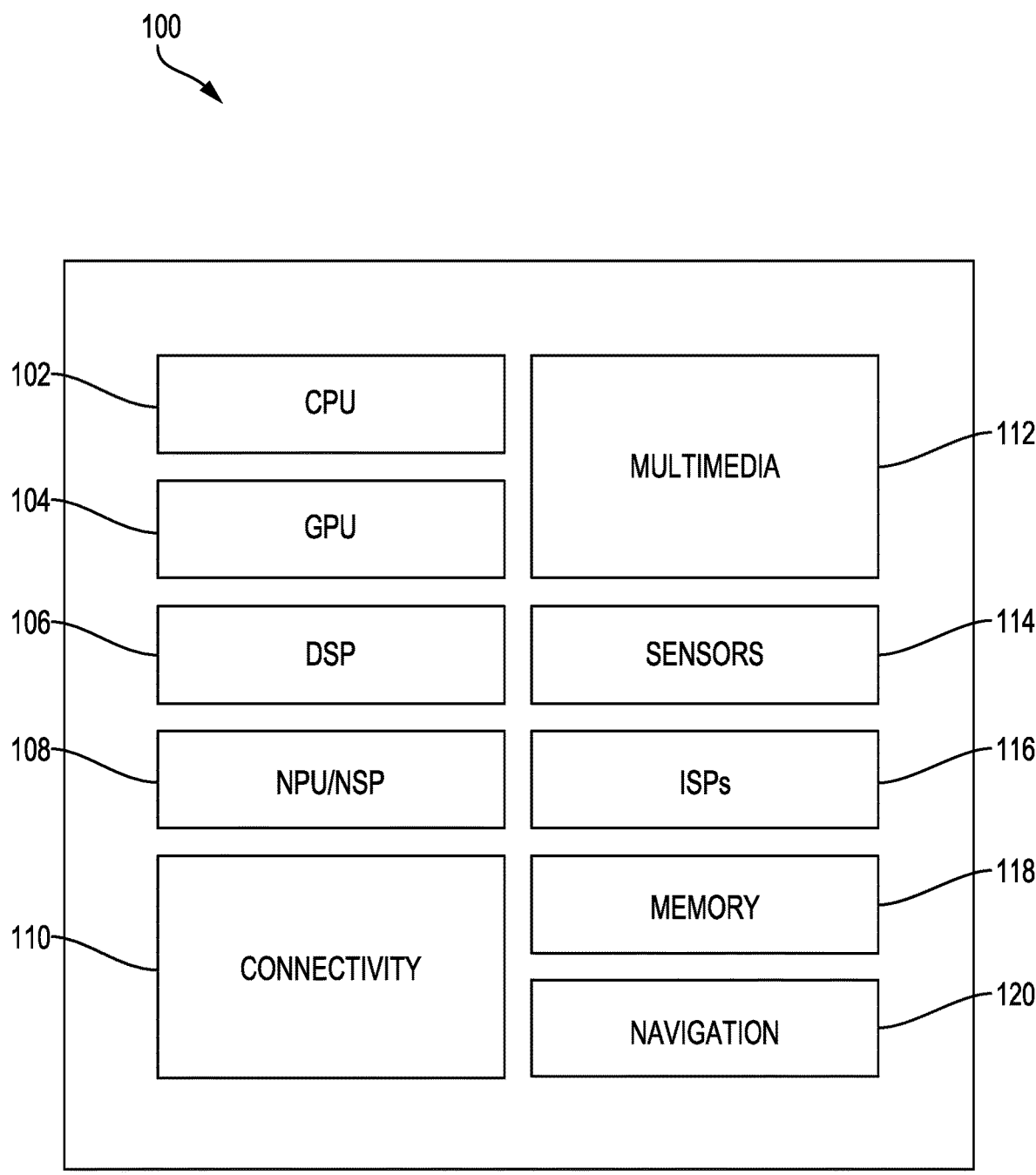
FIG. 1 illustrates an example implementation of a host system-on-chip (SoC), which is configured for an instruction set architecture push with frame pointer instruction, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form to avoid obscuring such concepts.

As described herein, the use of the term "and/or" is intended to represent an "inclusive OR," and the use of the term "or" is intended to represent an "exclusive OR." As described herein, the term "exemplary" used throughout this description means "serving as an example, instance, or illustration," and should not necessarily be construed as preferred or advantageous over other exemplary configurations. As described herein, the term "coupled" used throughout this description means "connected, whether directly or indirectly through intervening connections (e.g., a switch), electrical, mechanical, or otherwise," and is not necessarily limited to physical connections. Additionally, the connections can be such that the objects are permanently connected or releasably connected. The connections can be through switches. As described herein, the term "proximate" used throughout this description means "adjacent, very near, next to, or close to." As described herein, the term "on" used throughout this description means "directly on" in some configurations, and "indirectly on" in other configurations. It will be understood that the term "layer" includes film and is not construed as indicating a vertical or horizontal thickness unless otherwise stated. As described, the term "substrate" may refer to a substrate of a diced wafer or may refer to a substrate of a wafer that is not diced. Similarly, the terms "chip" and "die" may be used interchangeably.

Modern-day processors are equipped with multiple cores, which range from efficient, in-order-execution, to super/hyper scalar architectures. The number of cores in these modern-day processors has steadily risen from approximately eight (8) processor cores in mobile processors to ninety-six (96) processor cores in server compute-platforms. Each processor core contains multiple integer processing units, floating point processing units, and load store units as part of their backend execution engine.

Many modern-day processors are developed based on proprietary processor architectures. Conversely, a fifth generation (V) reduced instruction set architecture (RISC-V) is an open-standard instruction set architecture (ISA) used to develop custom processors for a variety of applications. The RISC-V ISA, which was developed at the University of California, Berkeley, is considered the fifth generation of processors built on the concept of a reduced instruction set computer (RISC). Unlike proprietary processor architectures, RISC-V is an open-standard ISA used for the development of processors targeting a variety of end-user applications.

Execution of real-world applications involves larger and more complex processor cores. Instructions added to a multi-core processor increase a size, complexity, and power dissipation of the processor. Recently, the RISC-V code size reduction task group promulgated Zc extensions, which form a portion of the RISC-V standard compressed instruction-set extension, referred to as "C." During execution, the Zc extension reduces static and dynamic code size by adding short 16-bit instruction encodings for common operations. Unfortunately, processors configured with the Zc extensions are unable to support a code size reduction when a frame pointer is present. An ISA push with frame pointer instruction to support a code size reduction is desired.

Various aspects of the present disclosure are directed to an instruction set architecture (ISA) push with frame pointer instruction. In various aspects of the present disclosure, a method for executing the ISA push with frame pointer instruction includes utilizing a frame pointer. The method also includes decoding the ISA push with frame pointer instruction. The method further includes executing the decoded ISA push with frame pointer instruction. In various aspects of the present disclosure, the method also includes performing, during the executing of the decoded ISA push with frame pointer instruction, a multiple store/multiple load operation on/from a stack to restore a predetermined stack format.

FIG. 1 illustrates an example implementation of a host system-on-chip (SoC) 100, which is configured for a fifth generation (V) reduced instruction set architecture (RISC-V) push/pop frame pointer instruction, in accordance with aspects of the present disclosure. The host SoC 100 includes processing blocks tailored to specific functions, such as a connectivity block 110. The connectivity block 110 may include sixth generation (6G), connectivity fifth generation (5G) new radio (NR) connectivity, fourth generation long term evolution (4G LTE) connectivity, Wi-Fi connectivity, USB connectivity, Bluetooth® connectivity, Secure Digital (SD) connectivity, and the like.

In this configuration, the host SoC 100 includes various processing units that support multi-threaded operation. For the configuration shown in FIG. 1, the host SoC 100 includes a multi-core central processing unit (CPU) 102, a graphics processor unit (GPU) 104, a digital signal processor (DSP) 106, and a neural processor unit (NPU)/neural signal processor (NSP) 108. The host SoC 100 may also include a sensor processor 114, image signal processors (ISPs) 116, a navigation module 120, which may include a global positioning system, and a memory 118. The multi-core CPU 102, the GPU 104, the DSP 106, the NPU/NSP 108, and the multimedia engine 112 support various functions such as video, audio, graphics, gaming, artificial networks, and the like. Each processor core of the multi-core CPU 102 may be an RISC-V machine, an advanced RISC machine (ARM), a microprocessor, or some other type of processor. The NPU/NSP 108 may be based on an ARM instruction set.

The multi-core CPU 102 is equipped with multiple cores. The number of cores in the multi-core CPU 102 may range from eight (8) processor cores in a mobile processor implementation to ninety-six (96) processor cores in a server compute platform implementation of the host SoC 100. In various aspects of the present disclosure, each processor core of the multi-core CPU 102 is developed using a fifth generation (V) reduced instruction set architecture (RISC-V). RISC-V is an open-standard instruction set architecture (ISA) used to develop custom processors for a variety of applications.

Execution of real-world applications using the multi-core CPU 102 involves larger and more complex processor cores. Instructions added to the multi-core CPU 102 increase a size, complexity, and power dissipation of the multi-core CPU 102. Recently, the RISC-V code size reduction task group promulgated Zc extensions, which form a portion of the RISC-V standard compressed instruction-set extension, referred to as "C." During execution, the Zc extension reduces static and dynamic code size by adding short 16-bit instruction encodings for common operations. Unfortunately, RISC-V processors of the multi-core CPU 102 configured with the Zc extensions are unable to support a code size reduction when a frame pointer is present due to a register order incompatibility between the application binary interface (ABI) and the Zc extension. A RISC-V push/pop instruction to support a code size reduction in the multi-core CPU 102 when a frame pointer is present is desired.

Figure 2:
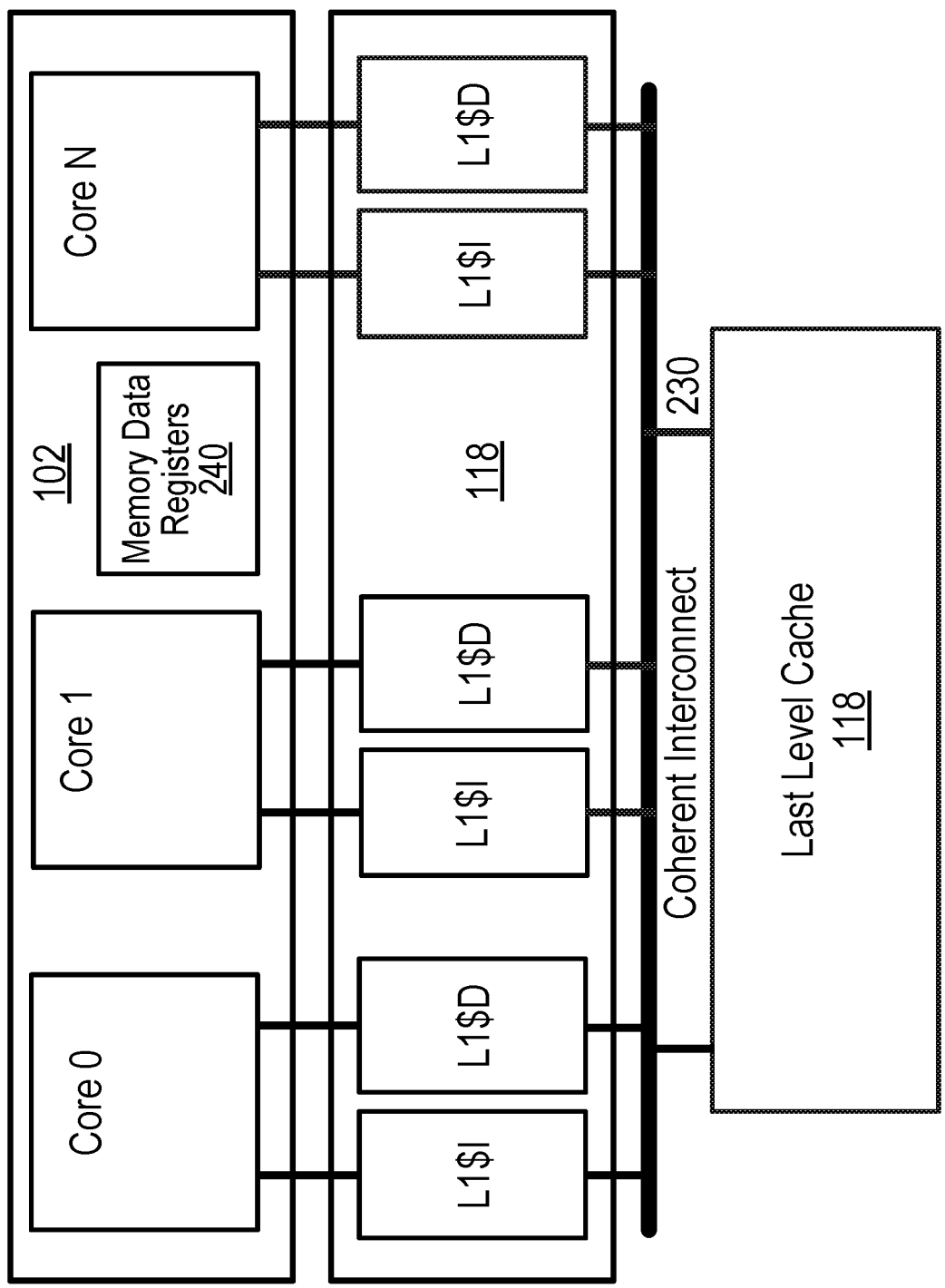
FIG. 2 is a circuit diagram further illustrating the system-on-chip (SoC) of FIG. 1, including memory data registers to support a push with frame pointer instruction, according to various aspects of the present disclosure.

FIG. 2 is a circuit diagram further illustrating the system-on-chip (SoC) of FIG. 1, including memory data registers to support a RISC-V push/pop frame pointer instruction, according to various aspects of the present disclosure. As shown in FIG. 2, an SoC 200 includes in the memory 118 (e.g., level-one (L1) cache and/or last level cache (LLC)) access through a coherent interconnect 230. In various aspects of the present disclosure, the SoC 200 is configured with memory data registers 240 to support a RISC-V push/pop frame pointer instruction of processor cores (e.g., Core 0, Core 1, . . . , Core N). In operation, the processor cores, configured with the Zc extensions, support new RISC-V push/pop frame pointer instructions to support a code size reduction with an application binary interface (ABI) format, for example, as further illustrated in FIG. 3.

Figure 3:
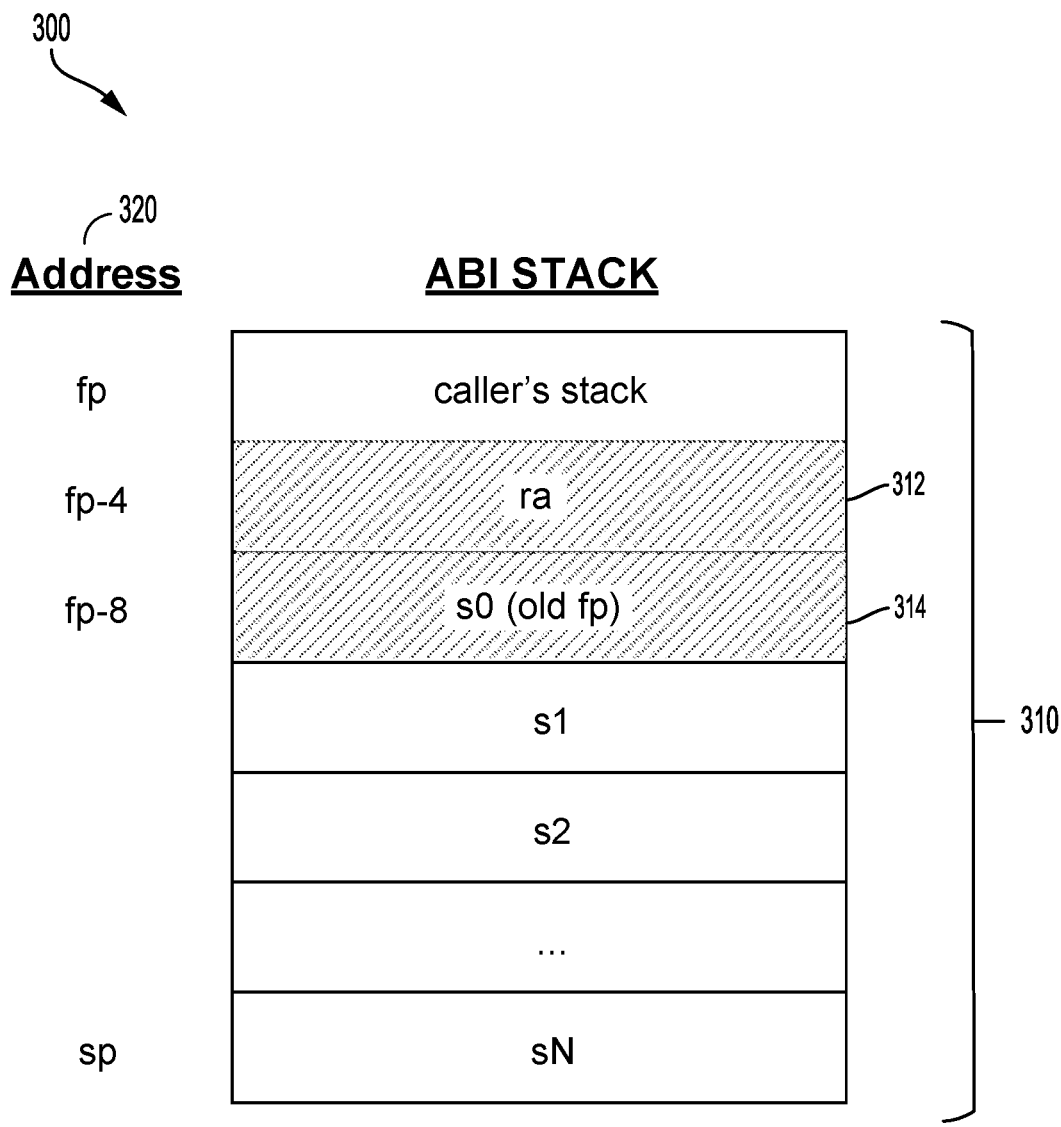
FIG. 3 is a block diagram further illustrating a stack layout in the memory data registers of FIG. 2, according to various aspects of the present disclosure.

FIG. 3 is a block diagram further illustrating a stack layout in the memory data registers of FIG. 2, restored by a RISC-V push/pop frame pointer instruction, according to various aspects of the present disclosure. In this example, an application binary interface (ABI) stack 300 is relative in response to a RISC-V push/pop frame pointer instruction. As shown, the ABI stack 300 specifies a location of a return address (RA) register 312 and a frame pointer register 314 of the ABI registers 310 in response to an ISA push instruction when a frame pointer is present, which is referred to an ISA push with frame pointer instruction.

As shown by an address column 320 of the ABI stack 300, a frame pointer (FP) address points to a start of the ABI stack 300. Additionally, an FP-4 address points to the RA register 312, which contains an RA address, and an FP-8 address points to the frame pointer register 314, which contains an old FP address. Data registers S (e.g., s1, s2, . . . , sN) are shown, in which a stack pointer (SP) address point to the sN data register. In operation, a current stack pointer register is copied to the frame pointer register 314 as well as performing a multiple store operation to the ABI stack 300 for pushing data onto the ABI stack 300 in response to an ISA push frame pointer instruction. In various aspects the present disclosure, execution of the ISA push with frame point instruction involves performing two ISA instructions having a size less than the ISA push with frame pointer instruction, as further illustrated in FIG. 4.

FIG. 4 is a table illustrating a RISC-V push/pop frame pointer instruction for a RISC-V standard compressed instruction-set extension, according to various aspects of the present disclosure. The ABI stack specifies that stack positions of the return address and the s0 data register (e.g., old FP) of the Zc extension stack match the ABI stack when an FP is in use. Nevertheless, the stack position of the data registers s1 to s11 can be in any order but should match a current compiler convention for implementing the ABI stack to provide consistency. As shown in FIG. 4, the CM.PUSHFP is added as a new RISC-V compressed Zc extension instruction for supporting a code size reduction when a frame pointer is present.

In operation, execution of the new instruction CM.PUSHFP performs the equivalent of C.MV FP, SP (e.g., moves the SP to the FP), and a CM.PUSH (e.g., ISA push instruction) in one 16-bit instruction to provide a code size reduction when a frame pointer is present. Beneficially, the new instruction CM.PUSHFP saves two bytes for each function call. Additionally, the new instruction CM.PUSHFP arguments match the CM.PUSH instruction, and the new instruction CM.PUSHFP uses a convenient Brownfield opcode (same as CM.PUSH but bit 8 is 1). A process for executing a RISC-V push/pop frame pointer instruction, for example, is shown in FIG. 5.

Figure 5:
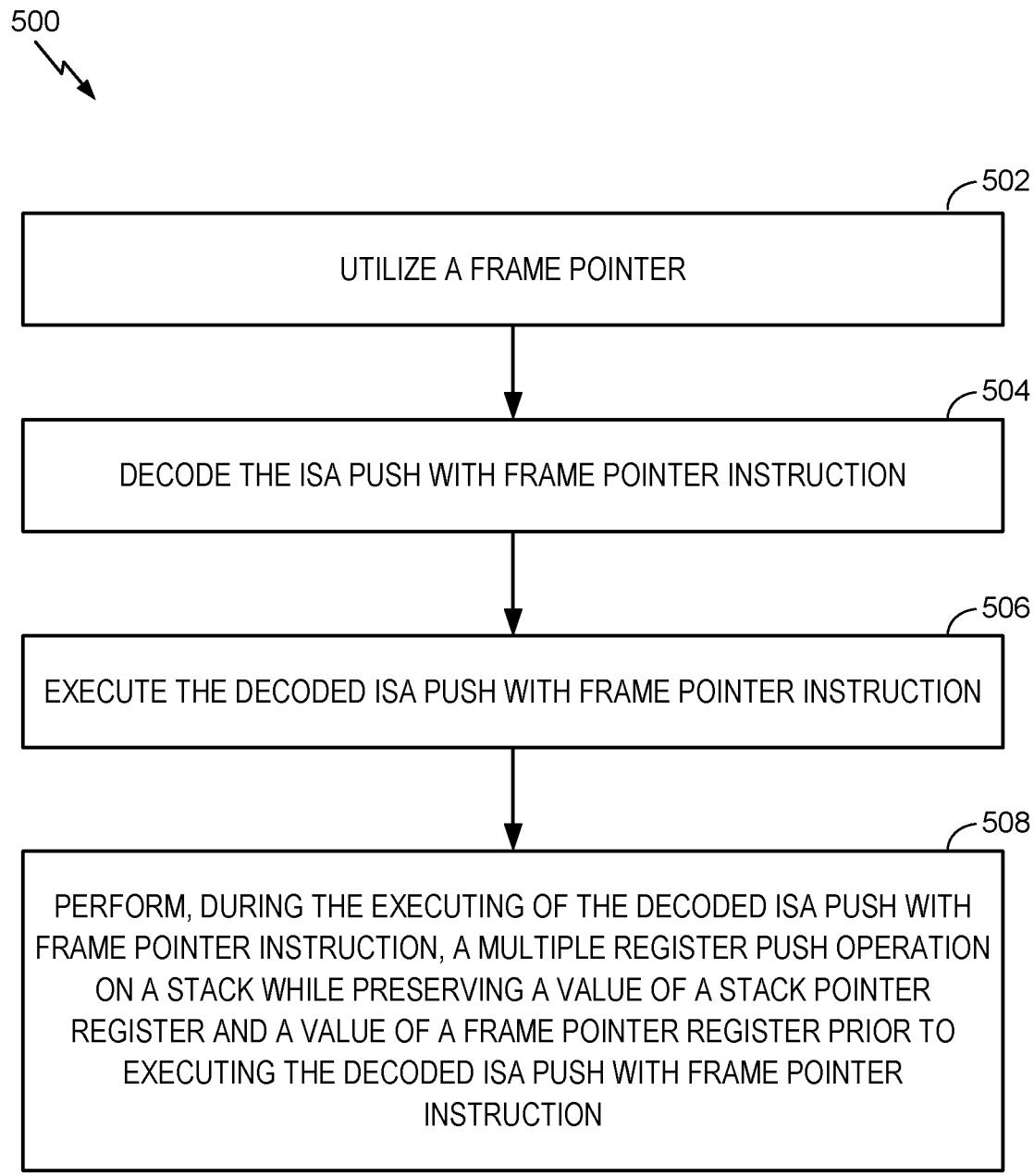
FIG. 5 is a process flow diagram illustrating a method for executing an ISA push with frame pointer instruction, according to various aspects of the present disclosure.

FIG. 5 is a process flow diagram illustrating a method 500 for executing a RISC-V push/pop frame pointer instruction, according to various aspects of the present disclosure. A method 500 begins a block 502, in which a frame pointer is utilized. For example, as shown in FIG. 3, an ABI stack 300 specifies a location of a return address (RA) register 312 and a frame pointer register 314 of the ABI registers 310 in response to an ISA push instruction when a frame pointer is present, which is referred to an ISA push with frame pointer instruction.

At block 504, the ISA push with frame pointer instruction is decoded. For example, as shown in FIG. 4, a CM.PUSHFP instruction is decoded. At block 506, the decoded ISA push with frame pointer instruction is executed. In operation, execution of the new instruction CM.PUSHFP performs the equivalent of C.MV FP, SP (e.g., moves the SP to the FP), and a CM.PUSH (e.g., ISA push instruction) in one 16-bit instruction to provide a code size reduction when a frame pointer is present. Beneficially, the new instruction CM.PUSHFP saves two bytes for each function call.

At block 508, a multiple register push operation is performed on a stack while preserving a value of a stack pointer register and a value of a frame pointer register prior to executing the decoded ISA push with frame pointer instruction. The multiple register push operation is performed during execution of the decoded ISA push with frame pointer instruction. For example, FIG. 4 illustrates pushing the value of the frame pointer register to the stack. This is followed by performing a copy operation to copy the value of the stack pointer register to the frame pointer register. Subsequently, the multiple register push operation is performed on the stack. According to various aspects of the present disclosure, a size of the ISA push with frame pointer instruction is less than a total size of a first instruction corresponding to the multiple register push operation and a second instruction corresponding to the copy operation.

In some aspects, the method 500 may be performed by the host SoC 100 (FIG. 1). That is, each of the elements of the method 500 may, for example, but without limitation, be performed by the host SoC 100 or one or more processors (e.g., multi-core CPU 102 and/or NPU 130) and/or other components included therein.

Figure 6:
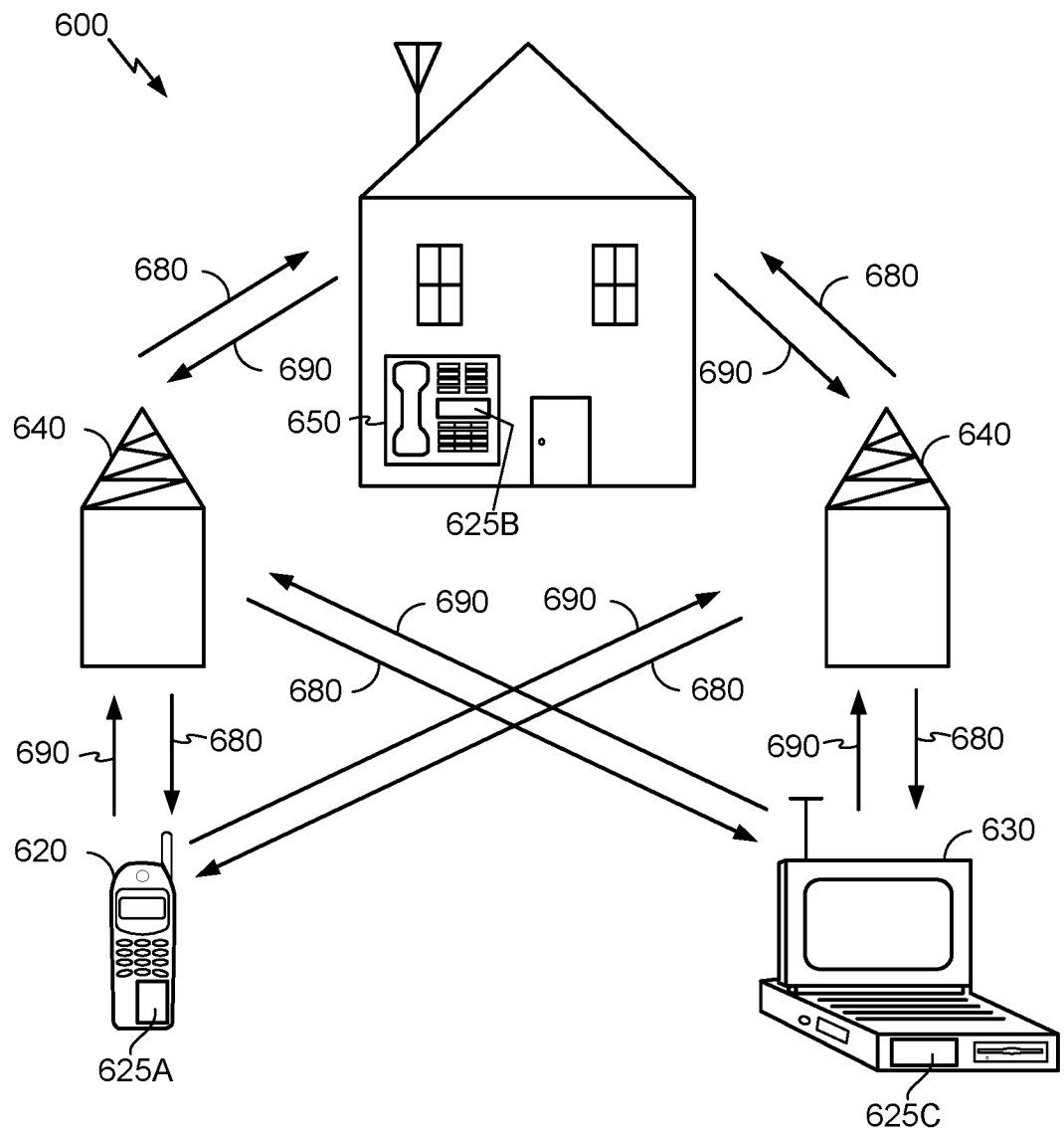
FIG. 6 is a block diagram showing an exemplary wireless communications system in which an aspect of the disclosure may be advantageously employed.

FIG. 6 is a block diagram showing an exemplary wireless communications system 600 in which an aspect of the disclosure may be advantageously employed. For purposes of illustration, FIG. 6 shows three remote units 620, 630, and 650, and two base stations 640. It will be recognized that wireless communications systems may have many more remote units and base stations. Remote units 620, 630, and 650 include IC devices 625A, 625B, and 625C that include the disclosed memory data registers for executing a push/pop frame pointer instruction. It will be recognized that other devices may also include the disclosed push/pop frame pointer instruction operation, such as the base stations, switching devices, and network equipment. FIG. 6 shows forward link signals 680 from the base stations 640 to the remote units 620, 630, and 650, and reverse link signals 690 from the remote units 620, 630, and 650 to base stations 640.

In FIG. 6, remote unit 620 is shown as a mobile telephone, remote unit 630 is shown as a portable computer, and remote unit 650 is shown as a fixed location remote unit in a wireless local loop system. For example, the remote units may be a mobile phone, a hand-held personal communications systems (PCS) unit, a portable data unit, such as a personal data assistant, a GPS enabled device, a navigation device, a set top box, a music player, a video player, an entertainment unit, a fixed location data unit, such as meter reading equipment, or other device that stores or retrieves data or computer instructions, or combinations thereof.

Although FIG. 6 illustrates remote units according to aspects of the present disclosure, the disclosure is not limited to these exemplary illustrated units. Aspects of the present disclosure may be suitably employed in many devices, which include the disclosed memory data registers for executing a push/pop frame pointer instruction.

Figure 7:
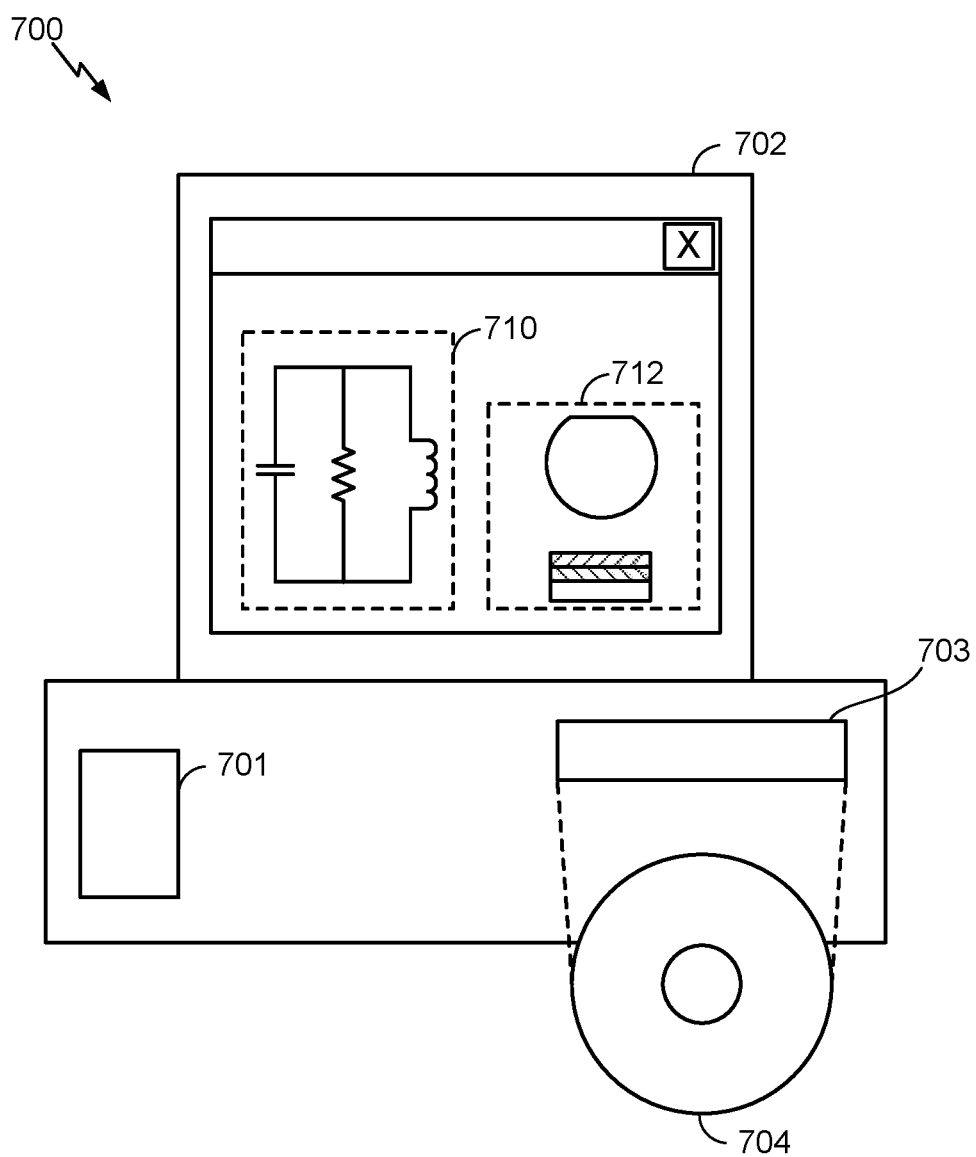
FIG. 7 is a block diagram illustrating a design workstation used for circuit, layout, and logic design of a semiconductor component, such as the memory data registers for executing a RISC-V push/pop frame pointer instruction disclosed herein.

FIG. 7 is a block diagram illustrating a design workstation used for circuit, layout, and logic design of a semiconductor component, such as the memory data registers for executing a RISC-V push/pop frame pointer instruction disclosed above. A design workstation 700 includes a hard disk 701 containing operating system software, support files, and design software such as Cadence or OrCAD. The design workstation 700 also includes a display 702 to facilitate design of a circuit 710 or an integrated circuit (IC) component 712 such as the memory data registers. A storage medium 704 is provided for tangibly storing the design of the circuit 710 or the IC component 712 (e.g., the memory data registers for executing a RISC-V push/pop frame pointer instruction). The design of the circuit 710 or the IC component 712 may be stored on the storage medium 704 in a file format such as GDSII or GERBER. The storage medium 704 may be a CD-ROM, DVD, hard disk, flash memory, or other appropriate device. Furthermore, the design workstation 700 includes a drive apparatus 703 for accepting input from or writing output to the storage medium 704.

Data recorded on the storage medium 704 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 704 facilitates the design of the circuit 710 or the IC component 712 by decreasing the number of processes for designing semiconductor wafers.

Implementation examples are described in the following numbered clauses:

1. A method for executing an instruction set architecture (ISA) push with frame pointer instruction, the method comprising:
    utilizing a frame pointer;
    decoding the ISA push with frame pointer instruction;
    executing the decoded ISA push with frame pointer instruction; and
    performing, during the executing of the decoded ISA push with frame pointer instruction, a multiple register push operation on a stack while preserving a value of a stack pointer register and a value of a frame pointer register prior to executing the decoded ISA push with frame pointer instruction.

2. The method of clause 1, in which performing comprises:
    pushing the value of the frame pointer register to the stack; then
    performing a copy operation to copy the value of the stack pointer register to the frame pointer register; and
    performing the multiple register push operation on the stack.

3. The method of clause 2, in which a size of the ISA push with frame pointer instruction is less than a total size of a first instruction corresponding to the multiple register push operation and a second instruction corresponding to the copy operation.

4. The method of any of clauses 1-3, in which the ISA push with frame pointer instruction comprises a fifth generation (V) reduced instruction set architecture (RISC-V) compressed Zc extension instruction.

5. The method of clause 4, in which the ISA push with frame pointer instruction comprises a 16-bit instruction.

6. The method of clause 1, in which performing the ISA push with frame pointer instruction comprises performing two ISA instructions having a size less than the ISA push with frame pointer instruction.

7. The method of any of clauses 1-6, further comprising pushing data on the stack according to the stack pointer register.

8. The method of any of clauses 1-7, in which operands of the ISA push with frame pointer instruction are a match to a fifth generation (V) reduced instruction set architecture (RISC-V) compressed Zc extension push instruction.

9. A non-transitory computer-readable medium having program code recorded thereon for executing an instruction set architecture (ISA) push with frame pointer instruction, the program code being executed by a processor and comprising:
    program code to utilize a frame pointer;
    program code to decode the ISA push with frame pointer instruction;
    program code to execute the decoded ISA push with frame pointer instruction; and
    program code to perform, during the executing of the decoded ISA push with frame pointer instruction, a multiple register push operation on a stack while preserving a value of a stack pointer register and a value of a frame pointer register prior to executing the decoded ISA push with frame pointer instruction.

10. The non-transitory computer-readable medium of clause 9, in which the program code to perform comprises:
    program code to push the value of the frame pointer register to the stack; then
    program code to perform a copy operation to copy the value of the stack pointer register to the frame pointer register; and
    program code to perform the multiple register push operation on the stack.

11. The non-transitory computer-readable medium of clause 10, in which a size of the ISA push with frame pointer instruction is less than a total size of a first instruction corresponding to the multiple register push operation and a second instruction corresponding to the copy operation.

12. The non-transitory computer-readable medium of any of clauses 9-11, in which the ISA push with frame pointer instruction comprises a fifth generation (V) reduced instruction set architecture (RISC-V) compressed Zc extension instruction.

13. The non-transitory computer-readable medium of clause 12, in which the ISA push with frame pointer instruction comprises a 16-bit instruction.

14. The non-transitory computer-readable medium of clause 9, in which the program code to perform the ISA push with frame pointer instruction comprises program code to perform two ISA instructions having a size less than the ISA push with frame pointer instruction.

15. The non-transitory computer-readable medium of any of clauses 9-14, further comprising pushing data on the stack according to the stack pointer register.

16. The non-transitory computer-readable medium of any of clauses 9-15, in which operands of the ISA push with frame pointer instruction are a match to a fifth generation (V) reduced instruction set architecture (RISC-V) compressed Zc extension push instruction.

For a firmware and/or software implementation, the methodologies may be implemented with modules (e.g., procedures, functions, etc.) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not limited to a particular type of memory or number of memories, or type of media upon which memory is stored.

If implemented in firmware and/or software, the functions may be stored as one or more instructions or code on a non-transitory computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer. Disk and disc, as used herein, include compact disc (CD), laser disc, optical disc, digital versatile disc (DVD), floppy disk and Blu-ray® disc, where disks usually reproduce data magnetically, while discs reproduce data optically with lasers. Combinations of the above should also be included within the scope of computer-readable media.

In addition to storage on a non-transitory computer-readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims.

Although the present disclosure and its advantages have been described in detail, various changes, substitutions, and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above, and below may refer to sides of a substrate or electronic device. Moreover, the scope of the present application is not intended to be limited to the configurations of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed that perform the same function or achieve the same result as the corresponding configurations described herein may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for executing an instruction set architecture (ISA) push with frame pointer instruction, the method comprising:
utilizing a frame pointer;
decoding the ISA push with frame pointer instruction;
executing the decoded ISA push with frame pointer instruction;
performing, during the executing of the decoded ISA push with frame pointer instruction, a multiple register push operation on a stack; and
preserving, during the executing of the decoded ISA push with frame pointer instruction, a value of a stack pointer register and a value of a frame pointer register, prior to the executing of the decoded ISA push with frame pointer instruction.

2. The method of claim 1, in which performing comprises:
pushing the value of the frame pointer register to the stack; then
performing a copy operation to copy the value of the stack pointer register to the frame pointer register; and
performing the multiple register push operation on the stack.

3. The method of claim 2, in which a size of the ISA push with frame pointer instruction is less than a total size of a first instruction corresponding to the multiple register push operation and a second instruction corresponding to the copy operation.

4. The method of claim 1, in which the ISA push with frame pointer instruction comprises a fifth generation (V) reduced instruction set architecture (RISC-V) compressed Zc extension instruction.

5. The method of claim 4, in which the ISA push with frame pointer instruction comprises a 16-bit instruction.

6. The method of claim 1, in which performing the ISA push with frame pointer instruction comprises performing two ISA instructions having a size less than the ISA push with frame pointer instruction.

7. The method of claim 1, further comprising pushing data on the stack according to the stack pointer register.

8. The method of claim 1, in which operands of the ISA push with frame pointer instruction are a match to a fifth generation (V) reduced instruction set architecture (RISC-V) compressed Zc extension push instruction.

9. A non-transitory computer-readable medium having program code recorded thereon for executing an instruction set architecture (ISA) push with frame pointer instruction, the program code being executed by a processor and comprising:
program code to utilize a frame pointer;
program code to decode the ISA push with frame pointer instruction;
program code to execute the decoded ISA push with frame pointer instruction;
program code to perform, during the executing of the decoded ISA push with frame pointer instruction, a multiple register push operation on a stack; and
program code to preserve, during the executing of the decoded ISA push with frame pointer instruction, a value of a stack pointer register and a value of a frame pointer register, prior to the executing of the decoded ISA push with frame pointer instruction.

10. The non-transitory computer-readable medium of claim 9, in which the program code to perform comprises:
program code to push the value of the frame pointer register to the stack; then
program code to perform a copy operation to copy the value of the stack pointer register to the frame pointer register; and
program code to perform the multiple register push operation on the stack.

11. The non-transitory computer-readable medium of claim 10, in which a size of the ISA push with frame pointer instruction is less than a total size of a first instruction corresponding to the multiple register push operation and a second instruction corresponding to the copy operation.

12. The non-transitory computer-readable medium of claim 9, in which the ISA push with frame pointer instruction comprises a fifth generation (V) reduced instruction set architecture (RISC-V) compressed Zc extension instruction.

13. The non-transitory computer-readable medium of claim 12, in which the ISA push with frame pointer instruction comprises a 16-bit instruction.

14. The non-transitory computer-readable medium of claim 9, in which the program code to perform the ISA push with frame pointer instruction comprises program code to perform two ISA instructions having a size less than the ISA push with frame pointer instruction.

15. The non-transitory computer-readable medium of claim 9, further comprising pushing data on the stack according to the stack pointer register.

16. The non-transitory computer-readable medium of claim 9, in which operands of the ISA push with frame pointer instruction are a match to a fifth generation (V) reduced instruction set architecture (RISC-V) compressed Zc extension push instruction.

\* \* \* \* \*